(12) United States Patent
Marmolin et al.

(10) Patent No.: US 7,020,846 B2
(45) Date of Patent: Mar. 28, 2006

(54) DISPLAY GENERATING DEVICE

(75) Inventors: Hans Marmolin, Linköping (SE);
Johanna Hultcrantz, Linköping (SE);
Johan Scott, Linköping (SE)

(73) Assignee: Nokia Corporation, (FI)

( * ) Notice: Subject to any disclaimer, the term of this patent is extended or adjusted under 35 U.S.C. 154(b) by 454 days.

(21) Appl. No.: 10/022,368

(22) Filed: Dec. 20, 2001

(65) Prior Publication Data

US 2002/0109678 A1    Aug. 15, 2002

(30) Foreign Application Priority Data

Dec. 27, 2000   (GB) .................................... 0031705

(51) Int. Cl.
*G06F 12/00* (2006.01)
(52) U.S. Cl. ...................................... 715/854; 715/851
(58) Field of Classification Search ................ 715/854, 715/853, 840, 851
See application file for complete search history.

(56) References Cited

U.S. PATENT DOCUMENTS

| 5,638,523 A | 6/1997 | Mullet et al. |
| 5,861,885 A * | 1/1999 | Strasnick et al. ........... 345/850 |
| 6,067,085 A | 5/2000 | Modh et al. |
| 6,578,017 B1 * | 6/2003 | Ebersole et al. ............... 706/4 |

FOREIGN PATENT DOCUMENTS

| EP | 01 31 0613 | 7/2002 |
| WO | WO 98/56188 | 12/1998 |

OTHER PUBLICATIONS http://www.mcli.dist.maricopa.edu/directors/tips/links/flashlight.html, Jan. 6, 1997, Flash Light Effect (2 pgs).
http://www.aisquared.com/products/zx.htm, ©2000, Zoom Text Xtra—screen magnification and screen reading for MS Windows, Nov. 7, 2001 (3 pgs.).

* cited by examiner

*Primary Examiner*—Cao (Kevin) Nguyen
(74) *Attorney, Agent, or Firm*—Banner & Witcoff, Ltd.

(57) ABSTRACT

A set-top box runs web browser software and displays on a television set a web page comprising hypertext links. A spotlight is used as a focus to navigate the page.

23 Claims, 5 Drawing Sheets

DISPLAY GENERATING DEVICE

FIELD OF THE INVENTION

The present invention relates to a display generating device and has particular but not exclusive application to multimedia network terminals.

BACKGROUND ART

A number of electronic devices have graphical user interfaces (GUIs). Such devices include, for example, personal computers (PC), televisions and mobile telephones. The user may interact with the device via the GUI using a user interface, for instance a touch sensitive pad, a keyboard, a mouse or a joystick. Many factors determine the most appropriate choice of user interface for a device, such as ease of use and speed of operation and the environment in which the device is used. The use of a mouse is suited to the selection of icons when using a desk-top personal computer. However, it is not so useful for a digital television set. For this, a remote control unit having several keys is more convenient.

However, there are problems with using key- or button-based control units, as will now be explained with reference to digital television.

Digital television systems provide a variety of new services as compared with analogue television. They allow the user to transmit and receive signals via a set-top box and to interact with service providers. The user may now access the Internet in a similar way that is already available on a PC. For example, a user may navigate web pages by selecting hypertext links. The process of selecting a particular link involves moving a focus between links and activating selection. In a PC-based system, this process is realised by positioning a mouse pointer over the link and pressing the mouse button. To indicate that the focus has moved to the link, the shape of the mouse pointer changes or the link is highlighted, for instance, by changing colour.

The set-top box/television system is controlled using a remote control unit, which is similar to that used in analogue television systems. The remote control is usually provided with a set of arrow keys—up, down, right, left—allowing orthogonal movement about a menu.

Such a remote control unit provides a satisfactory means for selecting elements of the menu if the menu is arranged as a rectangular array along co-ordinates defined by the keys on the remote control. Elements in a column are selected by the use of up and down arrow keys, while elements along a row may be selected by use of right and left arrow keys. Thus, movement from one element to another is straightforward and intuitive.

However, the remote control unit is not suited to the selection of irregularly positioned elements, such as hypertext links in a web page.

To select a link, the user moves the focus to the link. If the focus is in the form of a pointer, such as an arrow or a cursor, the user positions the focus over the link using the arrow keys. However, this method of navigation is difficult since movement of the pointer is limited to the directions defined by the arrow keys. Furthermore, positioning of the pointer over the link becomes more difficult as the size of the link decreases. This problem may be avoided if the arrow keys are used to "step" the focus from one link to another in which case the link in focus is indicated by highlighting it in a different colour. However, this method of navigation has its own problems. Not only is this method slow, but it is also unpredictable.

Both these methods of navigation share another problem. While the user is navigating a web page, they usually concentrate on the focus. As the focus moves, the user's eye follows it. However, the user has to find the focus before they can navigate. This can happen for example when a web page is first downloaded, if the user restarts navigating a web page or if the focus unexpectedly jumps. Under these circumstances it can be difficult to locate the focus, whether it be a pointer or a highlighted link.

The present invention seeks to help overcome these problems.

SUMMARY OF THE INVENTION

According to a first aspect of the present invention, there is provided a display generating device configured to generate signals for a graphical display device, comprising a processor for modifying an image by spotlighting a region of the image relative to its surroundings using a trackable spotlight.

Said spotlit region may be brighter than its surroundings or a different colour from its surroundings. A first object within said spotlit region may have a relatively high contrast against said spotlit region and a second object within said surroundings may have a relatively low contrast against said surroundings.

A first object within said spotlit region may be in sharper focus than a second object within said surroundings.

The spotlight may be locatable so as to enclose partly or wholly a functional display region so as to permit selection thereof. The spotlight may have a diffuse boundary and may be substantially circular. The spotlight may be slideably moveable about said image.

The device may be included in a multimedia network terminal, such as an internet-enabled digital television set-top box.

According to a second aspect of the present invention there is provided a method, in a display generating device configured to generate signals for a graphical display device, of operating the device, the method comprising modifying an image by spotlighting a region of the image relative to its surroundings using a trackable spotlight.

According to a third aspect of the present invention there is provided computer program comprising computer code to make a computer configured to generate signals for a graphical display device execute procedure to modify an image by spotlighting a region of the image relative to its surroundings using a trackable spotlight.

BRIEF DESCRIPTION OF THE DRAWINGS

An embodiment of the present invention will now be described, by way of example, with reference to the following drawings in which.

PREFERRED EMBODIMENT OF THE INVENTION

Figure 1:
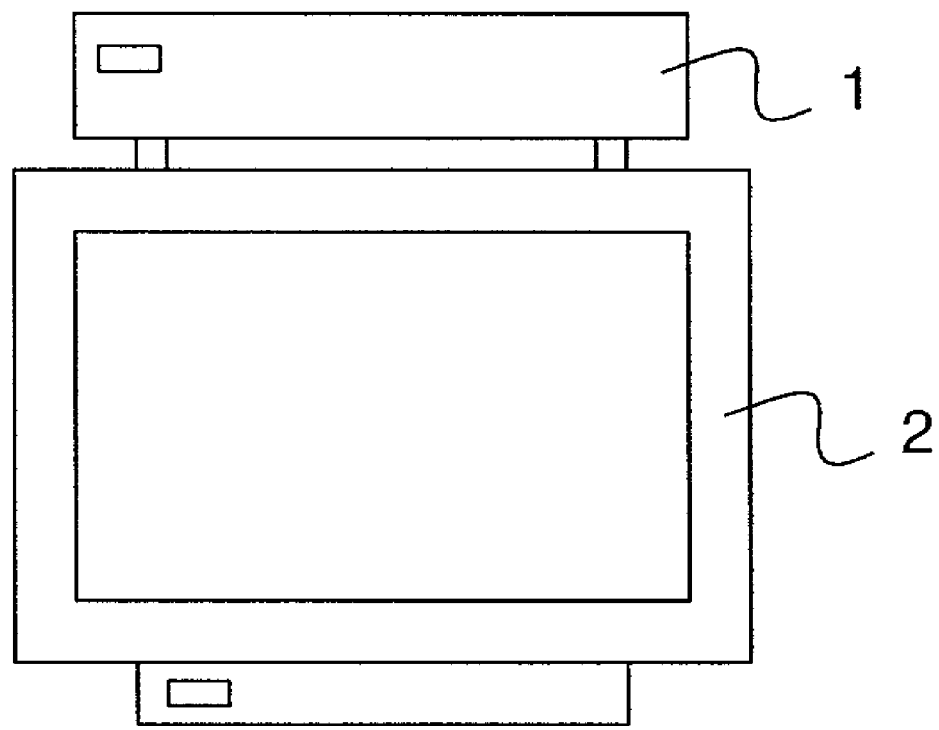
FIG. 1 is a schematic view of a set-top box and a television set.
Figure 1:
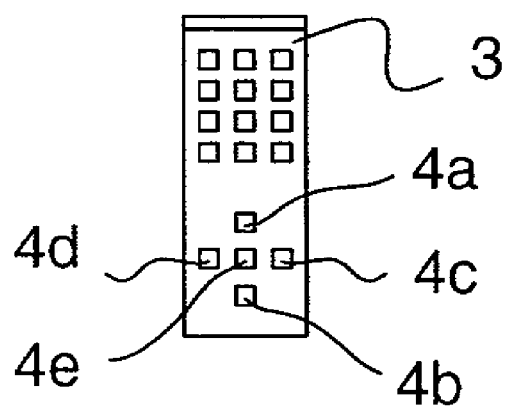

Referring to FIG. 1, an embodiment of a display generating device according to the present invention is a digital set-top box 1 which is connected to a display device in the form of a conventional television set 2. The set-top box 1 is controlled using a remote control unit 3 having up, down, right and left keys 4a, 4b, 4c, 4d and a select button 4e. In this case, up, down, right and left directions correspond to movement as seen on the television set 4.

The set-top box 1 comprises one or several input ports (not shown) including a port for a satellite antenna dish, a port for a terrestrial antenna, a port for a cable link and a port for a broadband internet connection and an output port (not shown) for connection to the television set. The set-top box 1 further comprises a microprocessor, memory, front-end tuner for filtering the signal, a video chip for rendering an image on the television set 2 and a user interface (not shown).

The set-top box 1 may be used to receive and decode digital television channels and transmit user information via a return channel. These channels are transmitted and received through a cable link, although links provided by satellite or terrestrial broadcast may also be used.

The set-top box 1 provides Internet services to the user, thus enabling the user to read e-mail and to "surf the web". To access the web, the set-top box 1 loads and runs web browser software.

Figure 2:
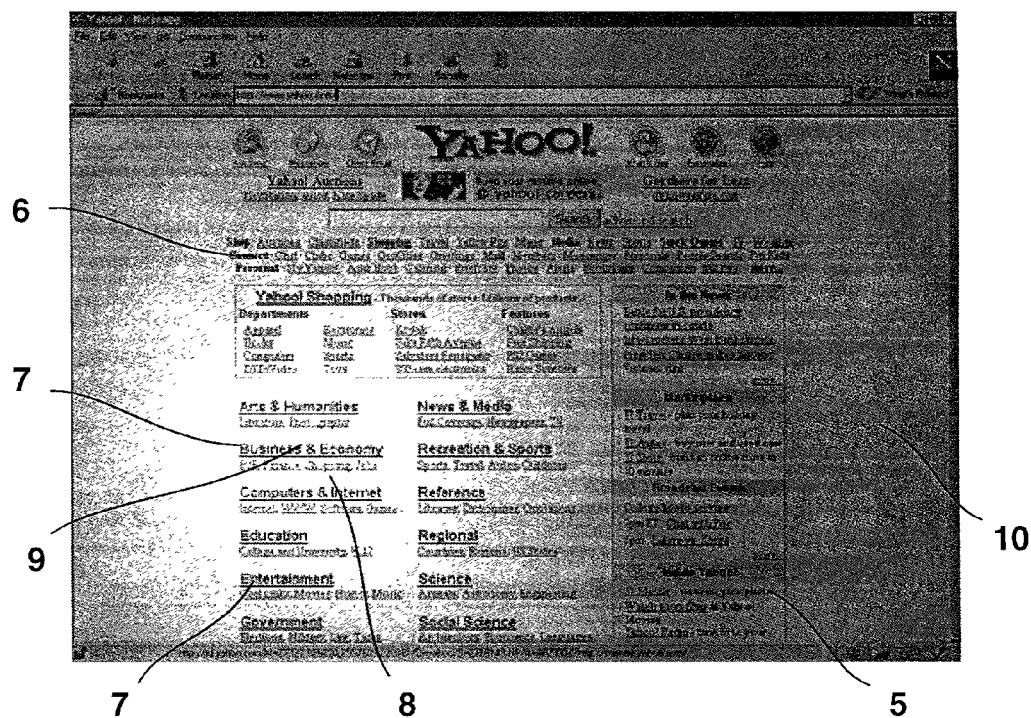
FIG. 2 shows a first web page including a first spotlight generated by a set-top box according to the present invention.
Figure 3:
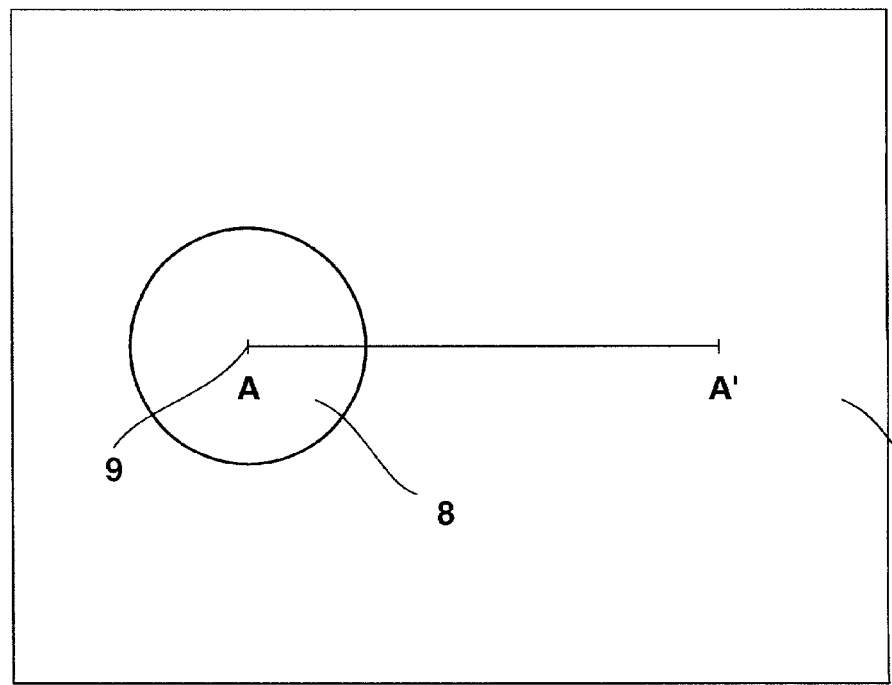
FIG. 3 is a simplified diagram of the web page shown in FIG. 2.

Referring to FIGS. 2 and 3, the web browser software is used navigate a web page 5 which comprises text 6 including a plurality of hypertext links 7. A circular, diffuse-edged spotlight 8 with a focal point 9 at its centre is used to navigate the page 5. The spotlight 8 appears to be relatively light, while a surrounding region 10 around it is relatively dark. This gives the appearance that the page 5 is illuminated by a narrow beam spotlight.

Figure 4:
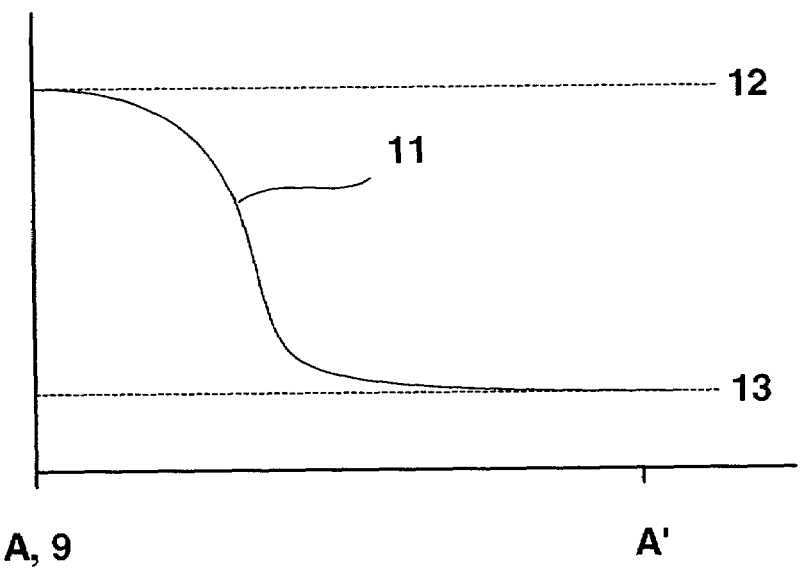
FIG. 4 is a plot of an upper limit of pixel intensity along a line A–A' on the web page shown in FIG. 2.

Referring to FIG. 4, pixel light intensities for the spotlight 8 and the surrounding regions 10 are defined by a maximum pixel intensity envelope function 11. The envelope function 11 has a maximum level 12 at the focal point 9 and decreases radially to a base level 13 for the surrounding region 10. Objects displayed on the page 5 and located in the centre of the spotlight 8 are viewed with a normal degree of intensity, i.e. as if displayed using a prior art set-top box running a conventional web browser. The further away from the centre of the spotlight 8 an object is located, the darker it appears to be.

Figure 5:
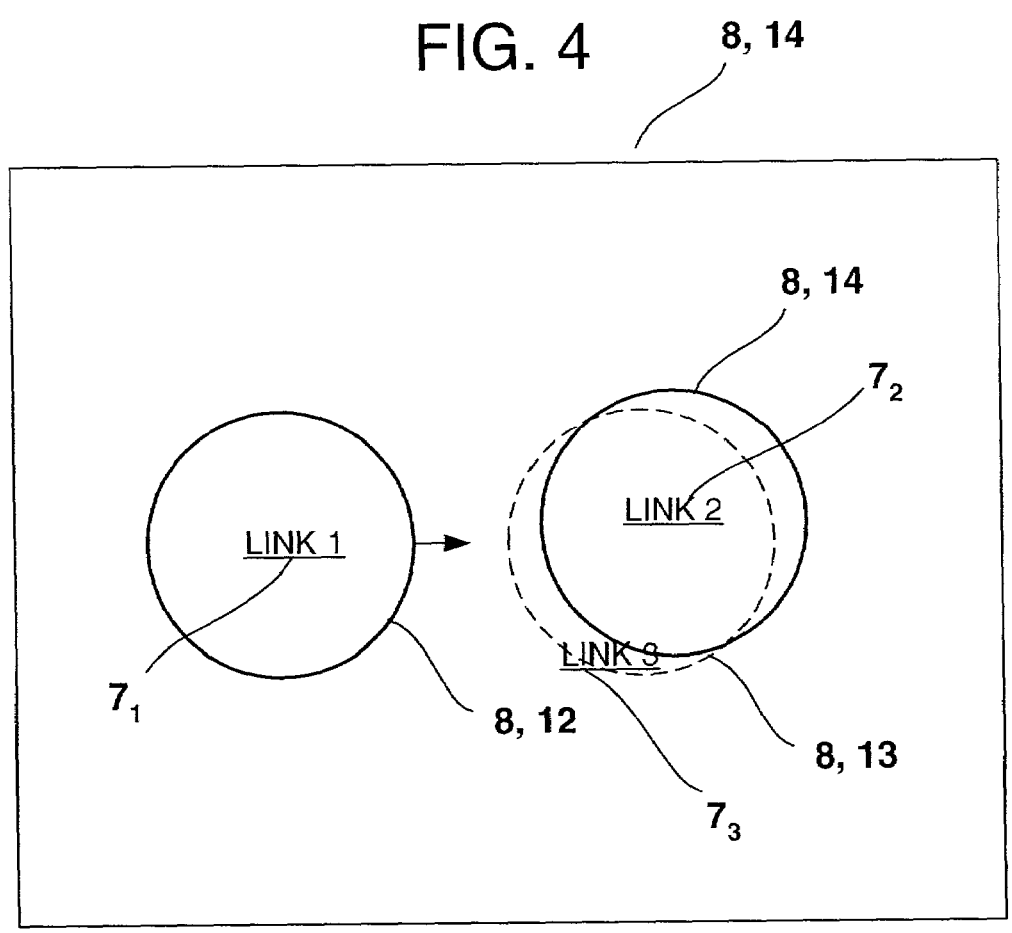
FIG. 5 illustrates navigation of the spotlight shown in FIG. 2.

Referring to FIG. 5, the spotlight 8 is navigated around the web page 5 using the arrow keys 4a, 4b, 4c, 4d. A first link $7_1$ is currently in focus and is illuminated by the spotlight 8 in a first position 12. The user presses the right arrow key 4c and the spotlight 8 slides across the page 5 to the right, as indicated by the arrow. When the user stops pressing the right arrow key 4c, the spotlight 8 is in a second position 13 as indicated by the dotted outline. Second and third links $7_2$, $7_3$ lie within the spotlight 8 when in the second position 13. The second link $7_2$ is closest to the centre of the spotlight 8 and so is selected. The spotlight 8 jumps to a third position 14 so that the focus point 9 coincides with the centre of the second link $7_2$. The link second link $7_2$ may be additionally be highlighted by changing colour. The user selects the second link $7_2$ by pressing the select button 4e on the remote control unit.

It will be appreciated that other criteria may be used to choose between the second and third links $7_2$, $7_3$. For example, the user may press another key (not shown) on the remote control unit 3 to toggle back and forth between the second and third links $7_2$, $7_3$ moving the spotlight 8 accordingly. If there are more than two links 7 within the spotlight 8, this key (not shown) may be used to iterate through each link 7.

It will be appreciated that the spotlight 8 may be moved according to other methods. For example, if keys are used, an ordered array of navigable nodes may be used such that each link is represented by at least one node. In another example, the spotlight 8 may be given a "push" by pressing an arrow key 4 and allowed to glide across the page 5 until an imaginary friction force or a user-actuated braking force causes it to stop. Multiple pushes can be used to accelerate the spotlight 8. The spotlight 8 may also be controlled using a mouse, touchpad, trackball or other pointing device.

Figure 6:
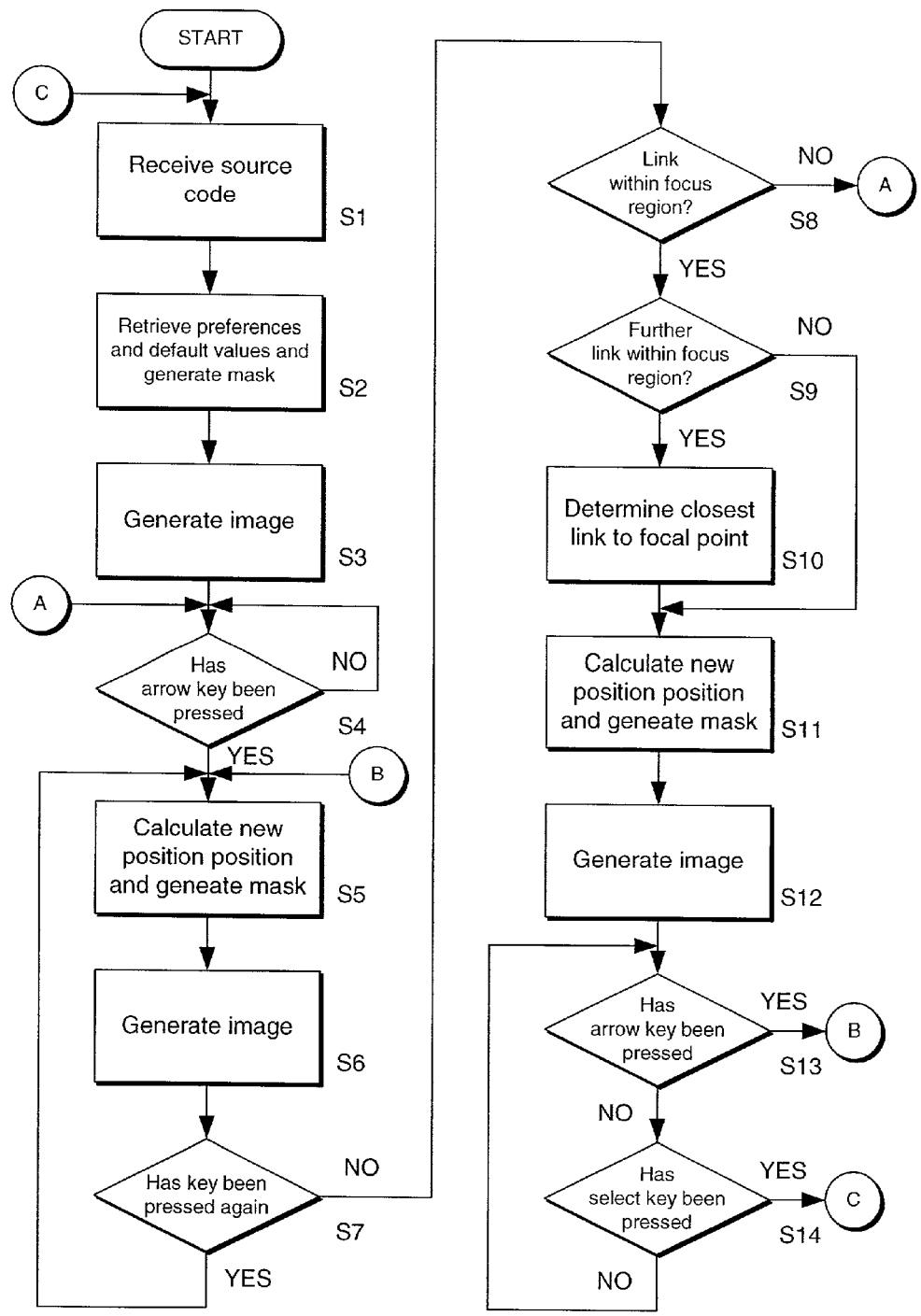
FIG. 6 is a process flow diagram for operating the set-top box shown in FIG. 1.
Figure 7:
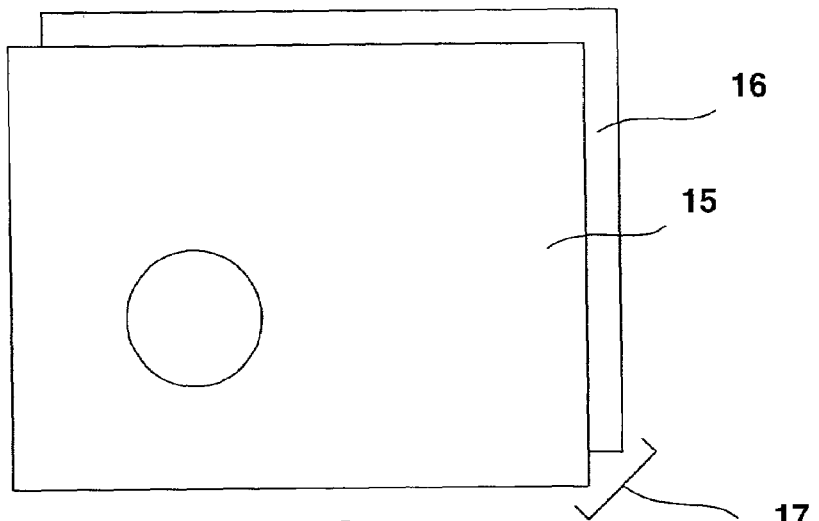
FIG. 7 show a screen image and a mask layer.

The method by which the set-top box 1 operates according to the present invention will be described with reference to FIGS. 6 and 7.

The browser receives source code for generating the web page 5 (step S1). User preferences for the size and shape of the spotlight 8, the pixel intensity envelope function 11 and default value of spotlight 8 position are used to generate a mask 15 (steps S2). A screen image 16 including the web page 5 is generated in manner well known per se. A masked screen image 17 is generated by combining the mask 15 and a screen image 16 (step S3). If an arrow key 4 is pressed on the remote control unit 3 (step S4), then a new spotlight 8 position is calculated, a new mask is generated (step S5) and a new masked screen image is displayed (step S6). If no further keys 4 are pressed within a predefined period of time (step S7), then the browser determines whether one of the plurality of links 7 is located within the spotlight 8 (step S8). If there is more than one link (step S9), the browser calculates the closest link 7 to the focal point 9 (step S10). A fresh spotlight 8 position is calculated, a fresh mask is generated and a fresh masked screen image is displayed with the spotlight centred on the link 7 (steps S11 & S12). If the user wishes to move the spotlight 8 and presses an arrow key 4, then a new spotlight 8 position is calculated, a new mask is generated and a new masked screen image is generate (step S5). However, if the user is satisfied with the link 7 and presses the select key 4e then the link 7 is selected and the process is repeated for the new page 5 (step S1).

The size of the spotlight 8 may be determined according to the size and/or the density of links 7 on the web page 5.

In one example, the spotlight 8 is substantially the same size as the largest link on the page 5. Alternatively, the spotlight may be the substantially the same size as the smallest link on the page 5. A spotlight 8 is substantially same size of a link 7 if a linear dimension of the spotlight 8, such as its diameter of width, is about the same as a linear dimension of the link 7, such as its diameter or height.

In another example, the spotlight 8 is set to a largest predetermined size, such as approximately, a quarter of the area of the web page, if there are five or less links 7 on the page 5. It is set to a middle predetermined size, such as about an eighth of the area of the web page 5, if there are five to ten links 7. The spotlight 8 is set to a smallest predetermined size, such as approximately a sixteenth the area of the web page 5, if there are more than ten links 7. The size of spotlight 8 may be recomputed every time a new page is visited or continuously updated according to the number of links 7 in the immediate vicinity of the spotlight 8.

It will be appreciated that the spotlight 8 may have different configurations. For example, the spotlight need not be circular but can be rectangular. Other geometric or regular shapes may be used such as triangles, hexagons or ellipses. The size and shape may be selected by the user or selected according to the shape of links 7 on the page 5. Furthermore, other pixel intensity functions may be used. For example, a minimum pixel intensity envelope function may be used. Thus, objects located in the centre of the spotlight 8 would be displayed with a normal degree of intensity, while those further away would appear bleached or faded. The spatial dependency of pixel intensity envelope function may also vary. For instance, instead of having radial symmetry, contours of constant pixel intensity may follow the outline of the spotlight 8. Furthermore, the spotlight 8 may have a sharp, rather than diffuse, edge.

Figure 8:
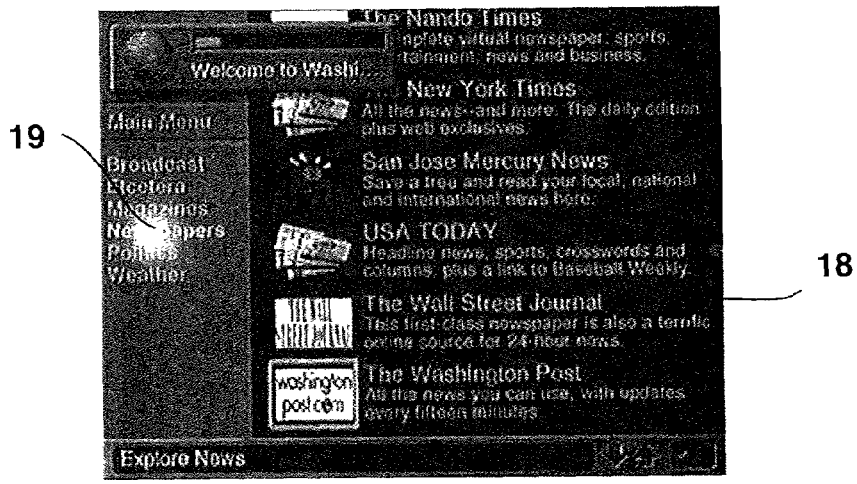
FIG. 8 shows a second web page with a second spotlight.

Referring to FIG. 8, a second web page 18 is shown with a second circular spotlight 19 having a diameter approximately equal to the height of a link.

Figure 9:
FIG. 9 shows a third web page with a third spotlight.

Referring to FIG. 9, a third web page 20 is shown with a third, rectangular spotlight 21.

It will also be appreciated that the spotlight 8 need not be brighter than the surrounding region 10. Other methods of distinguishing between the spotlight 8 and the surrounding region 10 may be used. For example, objects in the spotlight 8 may have a relatively high contrast compared with to the rest of the spotlight 8, while those objects in the surrounding region may have a relatively low contrast is compared with the rest of the surrounding region. Variations in colour may also be used, such that objects in focus are coloured naturally, while those in the surrounding area are coloured for example, red, green or blue only. Alternatively, objects in the spotlight may be "optically" in focus, while those in the surrounding region may be blurred.

It will be appreciated that many modifications may be made to the embodiment described above. The device need not be a set-top box, but may be any sort of multimedia network terminal, for instance a PC, games console, a web pad or a personal digital assistant. The device may also be a mobile station, such as a telephone.

The selectable objects need not be hypertext links, but can be any type of logically selectable event or item, such as a file icon on a desktop of a GUI interface of a PC.

The invention claimed is:

1. A display generating device configured to generate signals for a graphical display device, comprising a processor for modifying an image by spotlighting a region of the image relative to its surroundings using a trackable spotlight which is slideably movable about the image, wherein an object within said surroundings is visible, wherein said image includes a plurality of objects and wherein said trackable spotlight is slideably movable within the image to move the spotlit region to permit selection of one of the objects of the image that falls within the spotlit region, wherein objects within said surroundings are also visible in addition to the object in the spotlit region.

2. A device according to claim 1, wherein said spotlit region is brighter than its surroundings.

3. A device according to claim 1, wherein said spotlit region is a different color from its surroundings.

4. A device according to claim 1, wherein a first object within said spotlit region has a relatively high contrast against said spotlit region and a second object within said surroundings has a relatively low contrast against said surroundings.

5. A device according to claim 1, wherein a first object within said spotlit region is in sharper focus than a second object within said surroundings.

6. A device according to claim 1, wherein the spotlight is locatable so as to enclose partly or wholly a functional display region so as to permit selection thereof.

7. A device according to claim 1, wherein the spotlight has a diffuse boundary.

8. A device according to claim 1, wherein the spotlight is substantially circular.

9. A multimedia network terminal including a device according to claim 1.

10. A multimedia network terminal according to claim 9, which is an internet-enabled digital television set top box.

11. A device according to claim 1, wherein said spotlit region has a focal point.

12. A device according to claim 11, wherein said focal point is used to select an object.

13. A device according to claim 11, wherein said focal point is used to select a hypertext link.

14. A device according to claim 1 configured to receive directional input and move said spotlight in dependence upon said directional input.

15. A device according to claim 1, wherein, said spotlit region appears relatively light and its surroundings appears relatively dark.

16. A device according to claim 15, wherein a pixel intensity of said spotlit region decreases radially to a base level for said surroundings.

17. A display generating device according to claim 1, wherein the spotlit region is graphically altered from its surroundings.

18. A method, in a display generating device configured to generate signals for a graphical display device, of operating the device, the method comprising modifying an image by spotlighting a region of the image relative to its surroundings using a trackable spotlight which is slideably movable about the image, wherein an object within said surroundings is visible, wherein said image includes a plurality of objects and wherein said trackable spotlight is slideably movable within the image to move the spotlit region to permit selection of one of the objects of the image that falls within the spotlit region, wherein objects within said surroundings are also visible in addition to the object in the spotlit region.

19. A display generating device according to claim 18, wherein the spotlit region is graphically altered from its surroundings.

20. A computer program comprising computer code to make a computer configured to generate signals for a graphical display device execute procedure to modify an image by spotlighting a region of the image relative to its surroundings using a trackable spotlight which is slideably movable about the image, wherein an object within said surroundings is visible, wherein said image includes a plurality of objects and wherein said trackable spotlight is slideably movable within the image to move the spotlit region to permit selection of one of the objects of the image that falls within the spotlit region, wherein objects within said surroundings are also visible in additional to the object in the spotlit region.

21. A display generating device according to claim 20, wherein the spotlit region is graphically altered from its surroundings.

22. A display generating device configured to generate signals for a graphical display device, comprising a processor configured to modify an image by spotlighting a region of the image relative to its surroundings using a trackable spotlight which is slideably movable about the image, wherein an object within said surroundings is visible, wherein said image includes a plurality of objects and wherein said trackable spotlight is slideably movable within the image to move the spotlit region to permit selection of one of the objects of the image that falls within the spotlit region, wherein objects within said surroundings are also visible in addition to the object in the spotlit region.

23. A display generating device according to claim 22, wherein the spotlit region is graphically altered from its surroundings.

* * * * *